(12) United States Patent
Logvinov

(10) Patent No.: US 8,838,953 B2
(45) Date of Patent: Sep. 16, 2014

(54) SYSTEM AND METHOD FOR USING AN OUT-OF-BAND DEVICE TO PROGRAM SECURITY KEYS

(75) Inventor: Oleg Logvinov, East Brunswick, NJ (US)

(73) Assignee: STMicroelectronics, Inc., Coppell, TX (US)

( * ) Notice: Subject to any disclaimer, the term of this patent is extended or adjusted under 35 U.S.C. 154(b) by 1521 days.

(21) Appl. No.: 12/156,832

(22) Filed: Jun. 5, 2008

(65) Prior Publication Data
US 2008/0307218 A1    Dec. 11, 2008

Related U.S. Application Data

(60) Provisional application No. 60/933,473, filed on Jun. 5, 2007.

(51) Int. Cl.
*H04L 29/06* (2006.01)

(52) U.S. Cl.
CPC .............. *H04L 63/065* (2013.01); *H04L 63/18* (2013.01)
USPC .......................... 713/150; 713/151; 713/168

(58) Field of Classification Search
CPC ... H04L 63/0428; H04L 63/166; H04L 63/08; H04L 63/0823; H04L 63/164; H04L 9/08; H04L 9/32; H04L 9/3271; H04L 9/3281; H04L 63/061; H04L 9/0844; H04L 63/18; H04L 2209/80; H04W 12/04; H04W 12/06; H04W 12/12; H04W 88/02; H04W 12/08; H04W 12/02; H04W 48/08; H04W 84/18; H04W 92/02; H04W 92/18; G06F 21/35
USPC .............. 380/270, 255; 713/168–170; 726/2; 455/410, 411; 709/226, 229
See application file for complete search history.

(56) References Cited

U.S. PATENT DOCUMENTS

| | | | |
|---|---|---|---|
| 6,184,779 B1 * | 2/2001 | Chen | 340/425.5 |
| 6,751,734 B1 * | 6/2004 | Uchida | 713/186 |
| 7,386,721 B1 * | 6/2008 | Vilhuber et al. | 713/156 |
| 2001/0020276 A1 * | 9/2001 | Kim et al. | 713/202 |
| 2002/0065065 A1 * | 5/2002 | Lunsford et al. | 455/411 |
| 2003/0120924 A1 * | 6/2003 | Immonen | 713/170 |
| 2003/0208763 A1 * | 11/2003 | McElhatten et al. | 725/58 |
| 2004/0161111 A1 * | 8/2004 | Sherman | 380/283 |
| 2005/0138154 A1 * | 6/2005 | Seto | 709/223 |
| 2005/0232428 A1 * | 10/2005 | Little et al. | 380/277 |
| 2006/0026417 A1 * | 2/2006 | Furusawa et al. | 713/2 |
| 2006/0205354 A1 * | 9/2006 | Pirzada et al. | 455/66.1 |
| 2006/0223593 A1 * | 10/2006 | Ishak | 455/574 |
| 2007/0050615 A1 * | 3/2007 | Xu et al. | 713/151 |
| 2007/0224980 A1 * | 9/2007 | Wakefield | 455/418 |

* cited by examiner

*Primary Examiner* — Nirav B Patel
(74) *Attorney, Agent, or Firm* — Slater & Matsil, L.L.P.

(57) ABSTRACT

A provisioning device is provided that communicates over a trusted out-of-band communications channel to digital electronic devices in order to exchange security data such as passwords and private or public keys, thereby establishing a secure communications network between the devices.

40 Claims, No Drawings

SYSTEM AND METHOD FOR USING AN OUT-OF-BAND DEVICE TO PROGRAM SECURITY KEYS

CROSS REFERENCE TO RELATED APPLICATION

This application claims the benefit of U.S. Provisional Application Ser. No. 60/933,473, filed Jun. 5, 2007, assigned to the assignee of this application and incorporated by reference herein.

BACKGROUND OF THE INVENTION

1. Field of the Invention

Embodiments of this invention relate generally to groups of devices that work together in a network and use security methods to protect their data and/or their network configuration. Embodiments of the present invention relate to the programming of security controls in the network, including passwords and security keys in groups of devices that are linked by local area networks, wide area networks, or combinations of the two. Various embodiments of the present invention can be utilized on a network based on any medium, wired or wireless, but will be described further herein in relation to a broadband power line network and/'or a local area network based on power line communications.

2. Background

There exist today many types of consumer electronic and enterprise electronic devices that work together as a group. For example, in a home theater, the iPOD doc, DVD player, surround sound system, and video display may all interact to provide entertainment. In a cell phone, the cell phone may contain a Bluetooth transceiver, which communicates with a Bluetooth earpiece. Typically, these systems are packet-based communications networks, where data is exchanged among a number of devices, based primarily on the actions being performed at any one of the devices. In today's home entertainment and related networks, the data can primarily be categorized into two main types: Control and request and content information (whether Isochronous or asynchronous). Content includes audio and video data of various formats (MPEG1, MPEG2, MPEG3, AVI, etc.) Control and request refers to data that relates to management and control of the audio and video streams including security aspects.

In recent years, there has been a great amount of interest in protecting this content data from copyright misuse or illegal distribution. The Digital Rights Management movement has significantly affected the entertainment industry, and the content users. In a related area, the Internet has been attacked by hackers who try to take information from the network or try to disrupt the networks. The general reaction to both of these types of problems is to impose a variety of security schemes that protect both content represented by the data in the network; and access to the network and/or the devices on the network. Security and privacy both require some type of secret, generally a secret password or a Key for encrypting and decryption the data. The art is mature with references to Private and Public keys that are used in encryption algorithms. The secret data has to be passed in a method that is trusted by all of the devices and users of the network. A lot of effort has been put on trying to make this complex process easy for the consumer to set up. One problem, for example, has been how to associate the cell phone with one and only one earpiece. Failure to do so, results in not being able to use one's personal equipment could result in ease dropping or theft of service. In this case, Bluetooth has a process whereby both devices have "associate buttons" that are activated at the same time thereby creating a short window of opportunity to associate. This short window of time is difficult for a hacker to anticipate so it is generally secure enough to secure the association process. In another method, a list of "willing" devices is displayed and the user is asked to select a device with which to associate. However, when the network is scattered throughout the house and the user is not within arms reach of each network device, this approach is problematic.

BRIEF SUMMARY OF THE INVENTION

In accordance with some embodiments of the present invention, there is provided a provisioning device that communicates over a trusted out-of-band communications channel to networked devices in order to exchange secret data such as passwords and private or public keys.

Embodiments of the present invention provide a convenient security-programming tool called the "provisioning device". In one embodiment, the devices on the network are all controllable from Infrared remote control devices. The provisioning device accesses the same IR port on these networked devices to program the security parameters one each device in the network. This not only solves the problem of programming remote distributed devices, but also has the characteristics of using a very directional IR communications link, which is hard to steal or disrupt (e.g.: is "trusted"); an IR link, which does not carry the content it is helping to protect; and an IR link that does not connect to the main network itself. These last two benefits define that this device is "out-of-band".

Some embodiments of the present invention provide an apparatus for programming a group of devices or distributed devices in a communications network with security codes and keys using an out-of-band programming device. Some embodiments of the present invention provide an apparatus for programming that is portable and is IR or RF based. Some embodiments of the present invention provide an apparatus that uses the same remote control port used by the network device's associated functional remote control.

The foregoing description has been provided by way of introduction, and is not intended to limit the scope of the attached claims.

DESCRIPTION OF THE PREFERRED EMBODIMENTS

There is an unmet need to make it easier to program the security parameters of consumer electronic and enterprise electronic devices that work together as a cluster or group, which need is met by the various embodiments of the present invention described herein. In some embodiments of the present invention, security is programmed from a portable provisioning device that is small and physically similar to a USB Thumb Drive, key chain flashlight or automobile wireless key fob. In a preferred embodiment, the trusted communications channel is infrared (IR). In other preferred embodiments, different trusted communications channels can be used. Some embodiments of the present invention relate to controlling the security of the provisioning device by rendering it inactive under certain conditions.

In some embodiments, the provisioning device may contain the memory and sufficient digital logic to receive and store secret data and to be able to transmit it on command. In this embodiment, the provisioning device may be a small device, the size, of example, of a USB thumb drive. This device may be provided with the purchase of the consumer electronic equipment, or may be provided by the manufacturer, installer or distributor. It can come with new equipment or be supplied with repaired or warranted equipment. For service technicians, it can be built into their service tools which may include a laptop.

To initialize the provisioning device, it may be connected via an electrical interface, USB in this example, to a PC or other tool, and loaded with the appropriate information using a "upload" software application. The provisioning device may be loaded with information including, but not necessarily limited to, the security information. It can also be loaded with default or custom system parameters such as the Network ID, Device ID, HomePlug power line communications network password and other data that defines or controls the network, network access or the devices themselves.

The provisioning device may also have an out-of-band communications port in it. In this embodiment, it may be an Infrared (IR) port that communicates with the IR ports already on the network devices that are also used for IR remote control (such as for volume control or content source selection). For security purposes, the protocol between the provisioning device and the network devices may be known only to the manufacturer and optionally one or more parties (e.g., other manufacturers) approved by the manufacturer. The data may be sent over a channel that is local (not part of the network) and not likely to be accessible to a hacker or other alien network device and, thus, the channel and provisioning device may be considered a trusted channel and a trusted device, respectively.

When activated by the press of a button on the provisioning device, the device may provision (set up) the security parameters of the network, for example, one device at a time. New devices can be added in this way. No special network trusted radius server or internet connection to a third trusted party is necessary and the provisioning can be done by a typical user. Alternatively to the button press, any network device that is not already set up, and consequently cannot communicate with a secured network, could instead monitor the IR port for the provisioning device. If found, the device to be networked can initiate the provisioning if it thinks the conditions are trustworthy. This makes it even easier for the user to program the device.

Once the provisioning is complete, a signal such as an audio or optical signal may be emitted by the networked or provisioning device so that the user knows the provisioning was successful. The provisioning device will no longer work on the networked device. To keep the system safe, the provisioning device may be deactivated after a fixed amount of time from the first use, for a fixed number of networked devices, or any other suitable limit or combination thereof. If a network device detects a threat that it is being hacked by a provisioning device, it can terminate the session, and may try to disable the provisioning device. The device may or may not be designed to be reset by a trusted party such as an installer. In some embodiments, it may be useful to allow a main device in the network, preferably one that contains all of the network setup and back up data, to program the provisioning device. For example, a special code may be entered into this network device and it can program the provisioning device over the bi-directional IR link. The provisioning tool can then be used to program other devices on the network. As before, the manufacturer has the option of causing this data to be time or use restricted, or alternatively, may offer it to the customer as a system data backup tool.

When a networked device is replaced by new or repaired equipment, allowing the tool be programmed by the main network device allows it to be easily added to the network that is already secured.

The various embodiments of the present invention described herein exemplify operation over a trusted IR link. It should be understood, however, that the present invention is applicable to a network based on any medium such as RF or even a special programming cable. Both wired and wireless networks, and derivatives, combinations and sub-combinations thereof, may be used in the various embodiments of the present invention as further described herein.

It is, therefore, apparent that there has been provided, in accordance with the various objects and advantages of the present invention, an apparatus for (for example) connecting audio speakers to a digital network. While the various objects of this invention have been described in conjunction with preferred embodiments thereof, many alternatives, modifications, and variations will be apparent to those skilled in the art. Accordingly, it is intended to embrace all such alternatives, modifications and variations that fall within the spirit and broad scope of this specification and the appended claims. The claims presented are representative of the inventions disclosed herein. Other, unclaimed inventions are also contemplated. The inventor reserves the right to pursue such inventions in later claims.

What is claimed is:

1. A method for programming security parameters into a plurality of networked devices in order to enable secure communication between the networked devices over a communications network, the method comprising:
   programming a provisioning device with at least one security parameter comprising at least one of a password and a security key, the security parameters stored in non-volatile memory on the provisioning device;
   for each networked device, transferring the at least one security parameter to internal storage of the networked device using a trusted out-of-band communications port of the device and in response to a user command while the provisioning device is activated, the communications port communicating over a local, non-network channel;
   using a security protocol of the network and the at least one security parameter for at least one of encryption of data transmitted over the network and securing access to the networked devices; and
   deactivating the provisioning device and inhibiting the provisioning device, while deactivated, from transferring additional security parameters to a specific networked device after the at least one security parameter has been successfully transferred to the specific networked device, until the provisioning device is reactivated.

2. The system recited in claim 1, wherein the portable provisioning device uses one of infrared (IR) and radio frequency (RF) technology to transmit the at least one of the password and public/private keys to the digital electronic devices in the network.

3. The system recited in claim 1, wherein the at least one of the password and the public/private keys comprise at least one of a HomePlug password, an encryption parameter, and a personal network password.

4. The system recited in claim 1, wherein the portable provisioning device comprises at least one switch for initiating a programming sequence.

5. The system recited in claim 1, wherein the out-of-band communication port is one of a USB, RS-232, and Ethernet port.

6. The system recited in claim 1, wherein the provisioning device comprises a remote control device for a consumer electronics device.

7. The system recited in claim 6, wherein said consumer electronics device comprises a television.

8. The system recited in claim 1, wherein the network devices provide feedback as a tone, signal or optical indication when programming is successful.

9. The system recited in claim 1, wherein the provisioning device provides feedback as a tone, signal or optical indication when programming was successful.

10. The system recited in claim 5, wherein the electronic interface port is dedicated solely for use in connection with programming security functions.

11. The system recited in claim 1, wherein the provisioning device is active only for a predetermined amount of time after initial activation of the provisioning device, after which it no longer operates as a provisioning device.

12. The system recited in claim 1, wherein the portable provisioning device becomes inactive after a predetermined amount of time, but can be reactivated by at least one of a distributor, a manufacturer, and a licensed installer.

13. The system recited in claim 1, wherein the portable provisioning device is active only for a predetermined number of uses, after which it no longer operates as a provisioning device.

14. The system recited in claim 1, wherein the provisioning device is capable of sending and receiving information to and from other networked devices and the other devices are also capable of receiving and sending the information.

15. The system recited in claim 1, wherein the communications network is one or more of a local area network, powerline network, wired network, or wireless network.

16. The system recited in claim 1, wherein the devices on the communications network comprise iPod docks, iPod devices, speakers, stereo component equipment, multimedia-to-network adapters, cable converters, Set Top boxes, digital cameras, video cameras, Ethernet bridges, Televisions, displays and/or PCs.

17. The system of claim 1, further comprising a main network device configured to program the provisioning device with secret data permitting the provisioning device to perform one or more of reprogramming one or more digital electronic devices and programming one or more digital electronic devices.

18. A system comprising a plurality of digital electronic devices, the system comprising:
a communications network connecting the digital electronic devices together, the network comprising a security protocol that protects at least one of data and access to the network, the protocol using one or more secret datum selected from at least one of a at least one password and at least one public/private key;
each digital electronic device comprising a trusted out-of-band communications port for transferring at least a portion of the secret data to internal storage of the digital electronic device;
a provisioning device configured to transmit at least a portion of the secret data via an out-of-band and local, non-network communications channel to the digital electronic devices in the network to thereby program the digital electronic devices; and
a main network device configured to program the provisioning device with secret data permitting the provisioning device to perform one or more of reprogramming one or more digital electronic devices and programming one or more digital electronic devices;
wherein the provisioning device is not portable, but still is able to communicate with all the devices to be programmed, and further wherein the provisioning device does not connect to the network;
wherein the provisioning device is configured to receive the secret data and to store the secret data in nonvolatile memory, and further configured to transmit at least a portion of the secret data to program at least one digital electronic device, the transmitting occurs in response to a user command; and
wherein each digital electronic device is configured to receive at least a portion of the secret data from the provisioning device and join the communications network using the security protocol and the received secret data.

19. A method for programming security parameters into a plurality of networked devices in order to enable secure communication between the networked devices over a communications network, the method comprising:
programming a provisioning device with at least one security parameter comprising at least one of a password and a security key, the security parameters stored in nonvolatile memory on the provisioning device;
for each networked device, transferring the at least one security parameter to internal storage of the networked device using a trusted out-of-band communications port of the device and in response to a user command, the communications port communicating over a local, non-network channel;
using a security protocol of the network and the at least one security parameter for at least one of encryption of data transmitted over the network and securing access to the networked devices; and
inhibiting the provisioning device from transferring additional security parameters to a specific networked device after the at least one security parameter has been successfully transferred to the specific networked device, until the provisioning device is reactivated.

20. The method recited in claim 19, wherein the at least one of a password and a security key is communicated between the provisioning device and the networked device using one or more of Infrared (IR) and radio frequency (RF) technology.

21. The method recited in claim 19, wherein the provisioning device comprises security codes and keys also comprises at least one switch for initiating the programming sequence.

22. The method recited in claim 19, wherein the provisioning device is programmed with the at least one security parameter using IR or RF technology.

23. The method recited in claim 19, wherein the provisioning device comprises an electronic interface port used to initially load the at least one security parameter into the provisioning device.

24. The method recited in claim 23, wherein the electronic interface port comprises a USB port.

25. The method recited in claim 19, wherein the provisioning device comprises an electronic interface port configured to initially load the at least one security parameter into the networked devices.

26. The method recited in claim 19, wherein the provisioning device comprises a remote control for a consumer electronics device.

27. The method recited in claim 19, wherein at least one of the network devices comprises at least one feedback component that provides an indication when programming is successful.

28. The method recited in claim 27, wherein the feedback component comprises at least one of a piezo electric disk, speaker, electronic signal interface and LED.

29. The method recited in claim 19, wherein the provisioning device comprises at least one feedback component that provides an indication when programming is successful.

30. The method recited in claim 27, wherein the feedback component comprises at least one of a piezo electric disk, speaker, electronic signal interface and LED.

31. The method recited in claim 25, wherein the electronic interface port is used only for the single purpose of programming security functions.

32. The method recited in claim 19, wherein provisioning device is active only for a predetermined amount of time after its initial activation, after which it no longer operates as a provisioning device.

33. The method recited in claim 19, where the provisioning device becomes inactive after a. predetermined amount of time, but can be reactivated by at least one of a distributor, a manufacturer, and a licensed installer.

34. The method recited in claim 19, wherein the provisioning device is only active for a predetermined number of uses, after which it no longer operates as a provisioning device.

35. The method recited in claim 19, wherein the provisioning device sends and receives information to and from other networked devices and the networked devices also receive and send information.

36. The method recited in claim 19, wherein the communications network comprises one or more of a local area network, powerline communications network, wired network, or wireless network.

37. The method recited in claim 19, wherein the provisioning device is portable.

38. The method recited in claim 19, wherein the provisioning device is not portable, but still is able to communicate with all the devices to be programmed.

39. The method recited in claim 19, wherein the devices on the communications network comprise iPod docks, iPod devices, speakers, stereo component equipment, multimedia-to-network adapters, cable converters, Set Top boxes, digital cameras, video cameras, Ethernet bridges, Television displays and/or PCS.

40. The method of claim 19, further comprising the method step of programming, via a main network device, the provisioning device with secret data permitting the provisioning device to perform one or more of reprogramming one or more digital electronic devices and programming one or more digital electronic devices.

* * * * *